(12) United States Patent
Takeda et al.

(10) Patent No.: US 12,562,037 B2
(45) Date of Patent: Feb. 24, 2026

(54) TACTILE SIGNAL GENERATION DEVICE AND TACTILE SIGNAL GENERATION METHOD

(71) Applicant: SONY GROUP CORPORATION, Tokyo (JP)

(72) Inventors: Hirofumi Takeda, Tokyo (JP); Shuichiro Nishigori, Tokyo (JP); Rina Kotani, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 12 days.

(21) Appl. No.: 18/566,871

(22) PCT Filed: Feb. 28, 2022

(86) PCT No.: PCT/JP2022/008279
§ 371 (c)(1),
(2) Date: Dec. 4, 2023

(87) PCT Pub. No.: WO2022/264537
PCT Pub. Date: Dec. 22, 2022

(65) Prior Publication Data
US 2024/0273981 A1 Aug. 15, 2024

(30) Foreign Application Priority Data
Jun. 15, 2021 (JP) ................................. 2021-099435

(51) Int. Cl.
*G08B 6/00* (2006.01)
*G06V 20/40* (2022.01)
*G11B 27/34* (2006.01)

(52) U.S. Cl.
CPC ............... *G08B 6/00* (2013.01); *G06V 20/46* (2022.01); *G11B 27/34* (2013.01)

(58) Field of Classification Search
CPC .......... G08B 7/00; G06V 20/46; G11B 27/34
See application file for complete search history.

(56) References Cited

U.S. PATENT DOCUMENTS

| | | | | |
|---|---|---|---|---|
| 2010/0010951 A1* | 1/2010 | Miyazaki | ............... | G06N 5/025 |
| | | | | 706/46 |
| 2016/0027264 A1* | 1/2016 | Choi | ........................ | G08B 6/00 |
| | | | | 340/407.1 |
| 2016/0080682 A1* | 3/2016 | Diaz | ..................... | A63F 13/285 |
| | | | | 386/227 |

(Continued)

FOREIGN PATENT DOCUMENTS

| | | | |
|---|---|---|---|
| JP | 2005-301827 A | | 10/2005 |
| JP | 2015060274 A | * | 3/2015 |
| JP | 2016-202486 A | | 12/2016 |

(Continued)

OTHER PUBLICATIONS

International Search Report and Written Opinion of PCT Application No. PCT/JP2022/008279, issued on Apr. 19, 2022, 09 pages of ISRWO.

*Primary Examiner* — Girumsew Wendmagegn
(74) *Attorney, Agent, or Firm* — CHIP LAW GROUP

(57) ABSTRACT

A tactile signal generation device includes a tactile signal generation unit that generates a tactile signal for providing a tactile stimulus to a user on the basis of musical characteristics of an audio signal or staging characteristics of a video signal.

12 Claims, 15 Drawing Sheets

(56)  References Cited

U.S. PATENT DOCUMENTS

2020/0012347 A1 *   1/2020   Wu .......................... G08B 6/00

FOREIGN PATENT DOCUMENTS

| JP | 2017-059206 A | 3/2017 |
| JP | 2020-010322 A | 1/2020 |
| WO | 2015/145893 A1 | 10/2015 |
| WO | 2020/059758 A1 | 3/2020 |

* cited by examiner

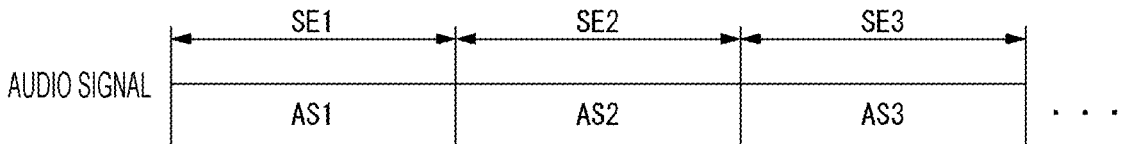

AUDIO SIGNAL

| SE1 | SE2 | SE3 |
|-----|-----|-----|
| AS1 | AS2 | AS3 |

· · ·

ANALYSIS RESULT

| · BASE<br>· SOLO<br>· · · | · SAXOPHONE<br>· CALM<br>· · · | · HIGHLIGHT<br>· INTENSE<br>· · · |
|---|---|---|

PARAMETER

| · AMPLITUDE 0.8<br>· ATTENUATION RATE<br>LARGE<br>· ONSET TIME<br>BASE SOUND<br>PRODUCTION | · AMPLITUDE 0.3<br>· ATTENUATION RATE<br>SMALL<br>· ONSET TIME<br>SAXOPHONE SOUND<br>PRODUCTION | · AMPLITUDE 1.0<br>· ATTENUATION RATE<br>MEDIUM<br>· ONSET TIME<br>KICK SOUND OF DRUM |
|---|---|---|

TACTILE SIGNAL

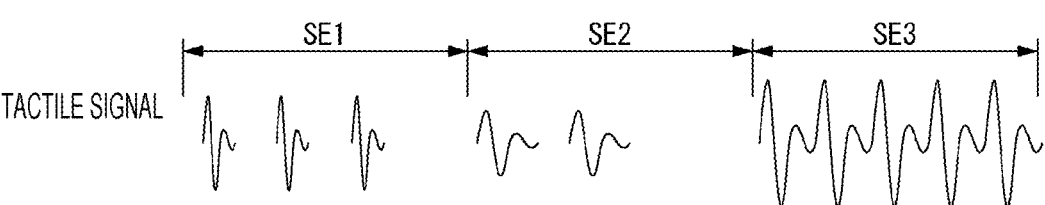

|  | SE1 | SE2 | SE3 |
|---|---|---|---|
| AUDIO SIGNAL | AS1 | AS2 | AS3 | · · · ·

| ANALYSIS RESULT | · BASE<br>· SOLO<br>· · · | · SAXOPHONE<br>· CALM<br>· · · | · HIGHLIGHT<br>· INTENSE<br>· · · |
|---|---|---|---|

| MIXING COEFFICIENT | · a1=0. 1<br>· a2=0. 0<br>· a3=1. 0 | · a1=0. 1<br>· a2=1. 0<br>· a3=0. 1 | · a1=1. 0<br>· a2=1. 0<br>· a3=1. 0 |
|---|---|---|---|

FIG. 13
AUDIO SIGNAL
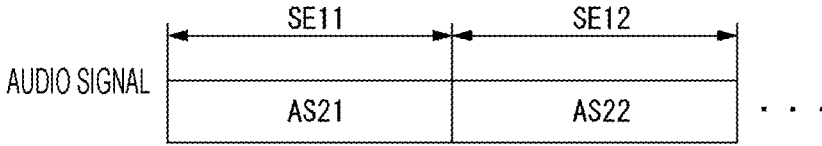
ANALYSIS RESULT
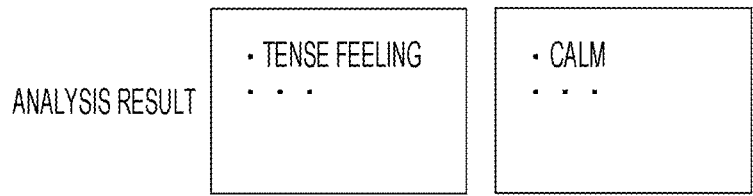
PARAMETER
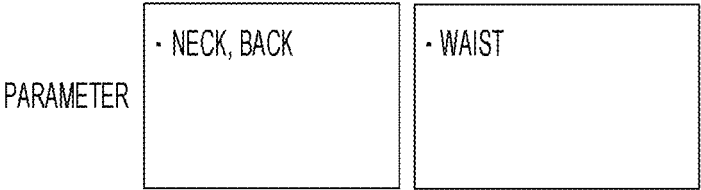

VIDEO SIGNAL

| | SE21 | |
|---|---|---|
| | VS21 | . . . |

ANALYSIS RESULT

- BASE
- BLUE ILLUMINATION
. . .

PARAMETER

- a1=0. 5
- a2=0. 0
- a3=0. 5

TACTILE SIGNAL GENERATION DEVICE AND TACTILE SIGNAL GENERATION METHOD

CROSS REFERENCE TO RELATED APPLICATIONS

This application is a U.S. National Phase of International Patent Application No. PCT/JP2022/008279 filed on Feb. 28, 2022, which claims priority benefit of Japanese Patent Application No. JP 2021-099435 filed in the Japan Patent Office on Jun. 15, 2021. Each of the above-referenced applications is hereby incorporated herein by reference in its entirety.

TECHNICAL FIELD

The present technology relates to a tactile signal generation device, a tactile signal generation method, and a program, and particularly relates to a technology for performing tactile presentation.

BACKGROUND ART

In recent years, a technology for giving tactile stimulus to a user by vibration of a device operated by the user has been developed. Here, the tactile stimulus refers to a physical phenomenon that makes the user feel a tactile sensation by vibration or the like. Furthermore, generating a tactile stimulus is referred to as tactile presentation.

A technology for performing tactile presentation is used in devices in various fields.

For example, in a terminal device including a touch panel such as a smartphone, a touch panel or a housing vibrates in response to a touch operation from a user and gives a tactile stimulus to a user's finger, so that a touch feeling on a button or the like displayed on the touch panel can be expressed.

Furthermore, for example, in a music listening device such as headphones, it is possible to emphasize a heavy bass in music being reproduced by giving a tactile stimulus in accordance with music reproduction.

Furthermore, for example, in a device that provides a computer game, virtual reality (VR), or the like, it is possible to improve the user's sense of immersion in the content by reproducing a sound and vibrating the controller or the like to give a tactile stimulus according to an operation using the controller or a content scene.

Furthermore, a technology of giving a tactile stimulus to a user on the basis of a tactile signal received from an external device has been developed. For example, Patent Document 1 below discloses a technique of giving tactile stimulus to a user while changing the frequency and amplitude of vibration on the basis of a received signal.

CITATION LIST

Patent Document

Patent Document 1: Japanese Patent Application Laid-Open No. 2016-202486

SUMMARY OF THE INVENTION

Problems to be Solved by the Invention

Meanwhile, a device that performs tactile presentation as described above may perform tactile presentation reflecting physical characteristics of an audio signal, such as a change in audio pressure and a low frequency band, for example. However, in such a device, since the physical characteristics of the audio signal are reflected, only uniform tactile presentation without change can be performed, and it is difficult to give realistic feeling to the user.

Therefore, an object of the present technology is to improve the realistic feeling given to the user.

Solutions to Problems

A tactile signal generation device according to the present technology includes a tactile signal generation unit that generates a tactile signal for providing a tactile stimulus to a user on the basis of musical characteristics of an audio signal or staging characteristics of a video signal.

Therefore, the tactile signal generation device can generate the tactile signal reflecting the musical characteristics of the audio signal or the staging characteristics of the video signal.

BRIEF DESCRIPTION OF DRAWINGS

FIG. 3 is a diagram illustrating an internal configuration of a reception device.

FIG. 5 is a diagram for explaining analysis results and parameters.

FIG. 13 is a diagram for explaining a vibration waveform in a seventh embodiment.

MODE FOR CARRYING OUT THE INVENTION

Hereinafter, embodiments will be described in the following order.

<1. Configuration of transfer system>
<2. Configuration of transmission device>
<3. Configuration of reception device>
<4. Specific example of transfer system>
<5. Structure of coded data>
<6. Modification>
<7. Summary>
<8. Present technology>

Note that the terms used in the present disclosure are defined as follows.

Tactile stimulus: a physical phenomenon that causes a person to perceive a tactile sense, for example, a vibration phenomenon and the like.

Tactile presentation: generation of a tactile stimulus.

Tactile signal: a signal that represents a tactile stimulus pattern, for example, a signal that represents a vibration waveform and the like.

Coded data: data obtained by encoding a signal. There are streams and frames as more specific concepts.

1. Configuration of Transfer System

Figure 1:
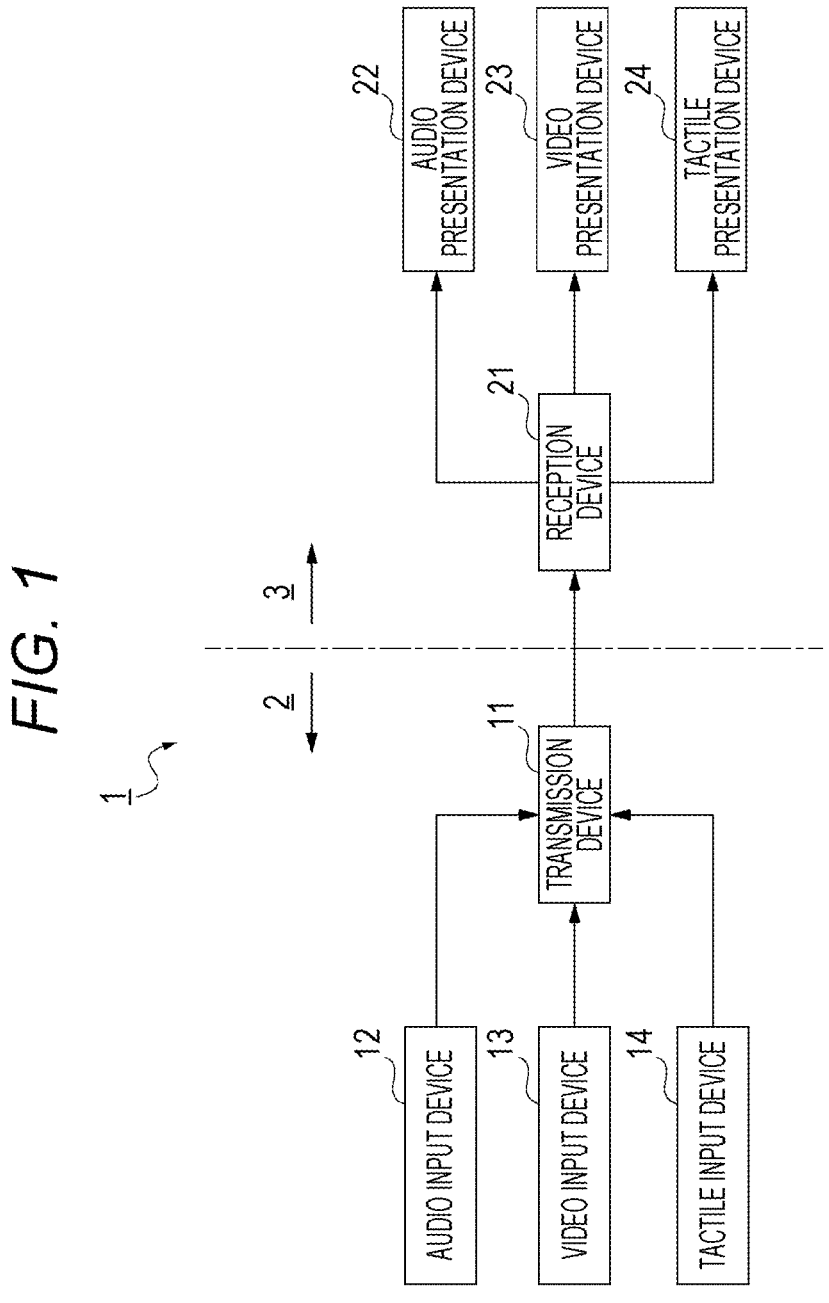
FIG. 1 is a diagram illustrating a configuration of a transfer system.

FIG. 1 is a diagram illustrating a configuration of a transfer system 1 including a tactile signal generation device as an embodiment according to the present technology. As illustrated in FIG. 1, the transfer system 1 includes a transmission system 2 and a reception system 3. The transmission system 2 and the reception system 3 are connected to a network such as the Internet, and can communicate with each other via the network.

The transmission system 2 is provided in, for example, a concert hall or the like, records audio and video of a concert (live performance) or the like, and transmits (distributes) the audio and video to a plurality of reception systems 3 in real time. Furthermore, the transmission system 2 transmits tactile information to the reception system 3 in addition to the recorded audio and video.

Here, the tactile information is information for generating a tactile signal in the reception system 3, and may include the tactile signal itself, or may include a waveform and a parameter for generating the tactile signal.

The transmission system 2 includes a transmission device 11, an audio input device 12, a video input device 13, and a tactile input device 14.

The transmission device 11 is a computer including a central processing unit (CPU), a digital signal processor (DSP), or the like, and integrally controls the transmission system 2.

The audio input device 12 includes a microphone 12a (see FIG. 4), and receives an audio signal obtained by collecting surrounding audio by the microphone 12a.

The video input device 13 includes a video camera 13a (see FIG. 4), and receives a video signal obtained by capturing a video by the video camera 13a.

The tactile input device 14 includes, for example, a tactile sensor, an acceleration sensor, or the like, and receives a tactile signal (vibration waveform) obtained by being detected by these sensors. Furthermore, the tactile input device 14 may receive a tactile signal stored in a predetermined storage device 15 (see FIG. 9).

The transmission device 11 acquires an audio signal input to the audio input device 12, a video signal input to the video input device 13, and a tactile signal input to the tactile input device 14. Furthermore, the transmission device 11 generates a parameter for generating a tactile signal in the reception system 3 on the basis of at least one of the acquired audio signal or video signal.

Then, the transmission device 11 encodes an audio signal, a video signal, tactile information (tactile signal, parameter), and the like according to a predetermined format. Then, the transmission device 11 transmits the coded data generated by encoding to the reception system 3. Note that, as described later in detail, the coded data may not include a tactile signal.

The reception system 3 reproduces audio and video on the basis of the coded data transmitted from the transmission device 11. Furthermore, the reception system 3 generates a tactile signal on the basis of the coded data transmitted from the transmission device 11, and performs tactile presentation on the basis of the generated tactile signal.

The reception system 3 includes a reception device 21, an audio presentation device 22, a video presentation device 23, and a tactile presentation device 24.

The reception device 21 is a computer including a CPU, a DSP, or the like, and obtains an audio signal, a video signal, and tactile information by receiving and decoding the coded data. Furthermore, the reception device 21 generates a tactile signal on the basis of the tactile information.

The audio presentation device 22 includes a voice output unit 22a such as a speaker or a headphone, for example, and outputs audio based on an audio signal.

The video presentation device 23 includes, for example, a display unit 23a (see FIG. 4) such as a liquid crystal display, an OLED display, or a projector device, and displays video based on a video signal.

The tactile presentation device 24 includes a vibrator 24a (see FIG. 4) such as a vibrator or an actuator, for example, and applies vibration based on a tactile signal to the user. Note that the tactile presentation device 24 may include, for example, a speaker array that outputs convergent ultrasonic waves or air cannons, a pressure presentation device that controls the amount of fluid in the device, an electrical stimulus device that directly stimulates a tactile receptor, and the like as long as it can present tactile stimulus to the user.

2. Configuration of Transmission Device

Figure 2:
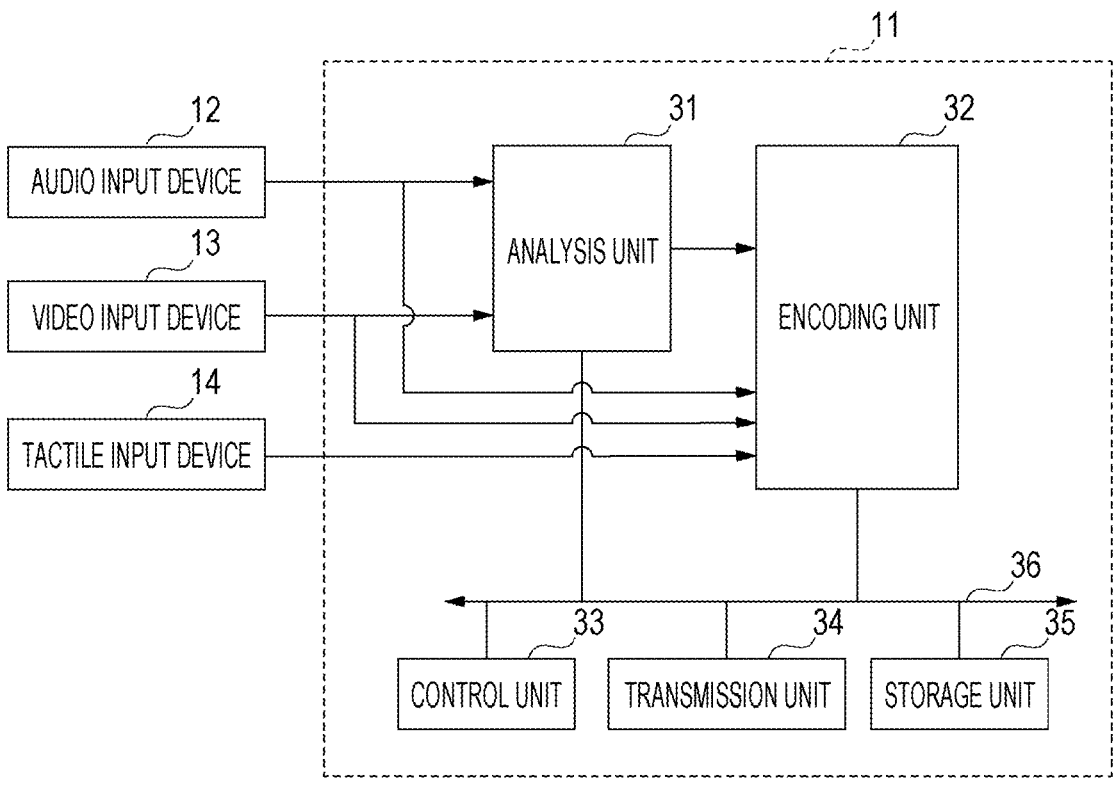
FIG. 2 is a diagram illustrating an internal configuration of a transmission device.

FIG. 2 is a diagram illustrating an internal configuration of the transmission device 11. Note that FIG. 2 illustrates the audio input device 12, the video input device 13, and the tactile input device 14 together with the internal configuration of the transmission device 11.

As illustrated in FIG. 2, the transmission device 11 includes an analysis unit 31, an encoding unit 32, a control unit 33, a transmission unit 34, and a storage unit 35. The analysis unit 31, the encoding unit 32, the control unit 33, the transmission unit 34, and the storage unit 35 are connected by a bus 36, and can perform data communication with each other.

The analysis unit 31 includes, for example, a DSP, and acquires at least one of an audio signal from the audio input device 12 or a video signal from the video input device 13. Then, the analysis unit 31 analyzes the acquired audio signal or video signal, and determines a parameter for generating a tactile signal in the reception system 3 on the basis of the analysis result.

For example, the analysis unit 31 acquires an audio signal from the audio input device 12 and performs audio information analysis by a known method. In the audio information analysis, waveform data of an audio signal is analyzed to extract musical characteristics. Note that the musical characteristics include not only physical information such as audio pressure and band, but also elements that define music, such as tone and mood of music, rhythm form, genre, playing instrument, and development of music.

Furthermore, the analysis unit 31 acquires the video signal from the video input device 13, and analyzes the video information by a known method. In the video information analysis, for example, image recognition is performed to detect a musical instrument uploaded as camerawork, and staging characteristics are extracted. Here, the staging characteristics include elements that form the video, such as camerawork, the color of the video, and a musical instrument shown in the video.

Then, the analysis unit 31 determines a parameter for generating a tactile signal in the reception system 3 on the basis of an analysis result of the audio information analysis or the video information analysis, that is, musical characteristics or staging characteristics. Then, the analysis unit 31 sends the determined parameter to the encoding unit 32. Here, the parameter is, for example, an amplitude of a vibration waveform, an onset time (vibration start timing), the number of iterations, an attenuation rate, a frequency, a mixing coefficient of a plurality of vibration waveforms, or the like.

Note that instead of the audio information analysis or video information analysis, the live related person may determine the parameter in real time simultaneously with the actual live performance. In this case, the determined parameter is sent to the encoding unit 32. In this method, generally performed operations such as volume adjustment for each musical instrument and position adjustment of a spotlight in live performance are extended to parameters.

The encoding unit 32 includes, for example, a DSP, and acquires an audio signal from the audio input device 12, a video signal from the video input device 13, and a tactile signal from the tactile input device 14. Furthermore, the encoding unit 32 acquires the parameter from the analysis unit 31. Then, the encoding unit 32 adds a time stamp to the acquired audio signal, video signal, and tactile information (tactile signal, parameter), performs encoding according to a predetermined format, and transmits the obtained coded data to the reception system 3.

The control unit 33 is provided with a microcomputer including a CPU, a read only memory (ROM), a random access memory (RAM) and the like, for example, and executes processing according to a program stored in the ROM to perform entire control of the transmission device 11.

The transmission unit 34 performs data communication with an external device on the basis of the control of the control unit 33. For example, it is possible to cause the reception device 21 to transmit the coded data obtained by the encoding unit 32.

The storage unit 35 comprehensively represents a storage device such as a hard disk drive (HDD) and a solid state drive (SSD), for example, and is used for storing various data in the transmission device 11.

For example, the storage unit 35 stores data necessary for control by the control unit 33. Furthermore, the coded data obtained by the encoding unit 32 may be stored in the storage unit 35 on the basis of the control of the control unit 33.

3. Configuration of Reception Device

Figure 3:
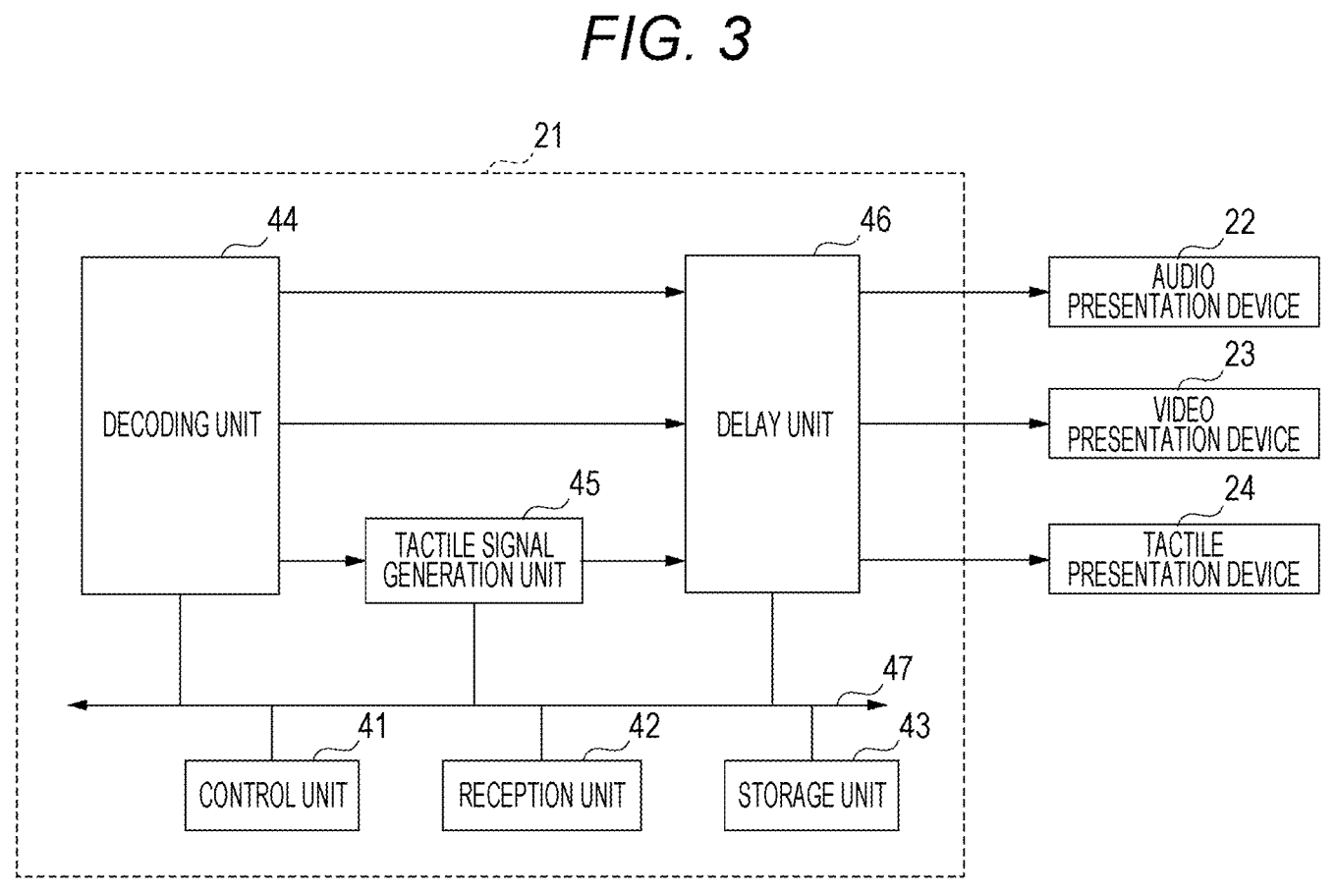

FIG. 3 is a diagram illustrating an internal configuration of the reception device 21. Note that FIG. 3 illustrates the audio presentation device 22, the video presentation device 23, and the tactile presentation device 24 together with the internal configuration of the reception device 21.

As illustrated in FIG. 3, the reception device 21 includes a control unit 41, a reception unit 42, a storage unit 43, a decoding unit 44, a tactile signal generation unit 45, and a delay unit 46. The control unit 41, the reception unit 42, the storage unit 43, the decoding unit 44, the tactile signal generation unit 45, and the delay unit 46 are connected by a bus 47, and can perform data communication with each other.

The control unit 41 includes, for example, a microcomputer including a CPU, a ROM, and a RAM and performs overall control of the reception device 21.

The reception unit 42 performs data communication with an external device on the basis of the control of the control unit 41. For example, the reception unit 42 can receive coded data transmitted from the transmission device 11.

The storage unit 43 comprehensively represents a storage device such as the HDD and the SSD, for example, and is used for storing various data in the reception device 21.

For example, the storage unit 43 stores data necessary for control by the control unit 41. Furthermore, under the control of the control unit 41, various signals obtained by the decoding unit 44 can be stored in the storage unit 43.

The decoding unit 44 includes, for example, a DSP, and decodes the coded data input via the reception unit 42 to obtain an audio signal, a video signal, and tactile information.

The tactile signal generation unit 45 includes, for example, a DSP, and generates a tactile signal on the basis of tactile information (parameter) obtained by being decoded by the decoding unit 44. That is, the tactile signal generation unit 45 generates a tactile signal for providing a tactile stimulus to the user on the basis of musical characteristics of an audio signal or staging characteristics of a video signal.

Here, the tactile signal may be delayed compared to the audio signal and the video signal. This is because, for example, when the audio information analysis of the audio signal is performed in the transmission device 11, the audio signal for a relatively long time is required. Therefore, the tactile signal generated on the basis of the parameter determined from the analysis result of the audio information analysis has a theoretical delay with respect to the audio signal.

Therefore, the delay unit 46 includes, for example, a DSP, and synchronizes the audio signal, the video signal, and the tactile signal by delaying any one of the audio signal, the video signal, and the tactile signal on the basis of the time stamp attached thereto. Then, the delay unit 46 outputs the audio signal to the audio presentation device 22, and causes the audio presentation device 22 to output audio based on the audio signal. Furthermore, the delay unit 46 outputs the video signal to the video presentation device 23, and causes the video presentation device 23 to display video based on the video signal. Moreover, the delay unit 46 outputs the tactile signal to the tactile presentation device 24, and causes the tactile presentation device 24 to present a tactile stimulus based on the tactile signal.

4. Specific Example of Transfer System

Hereinafter, a specific example when the transfer system 1 is actually used will be described.

4.1 First Specific Example

Figure 4:
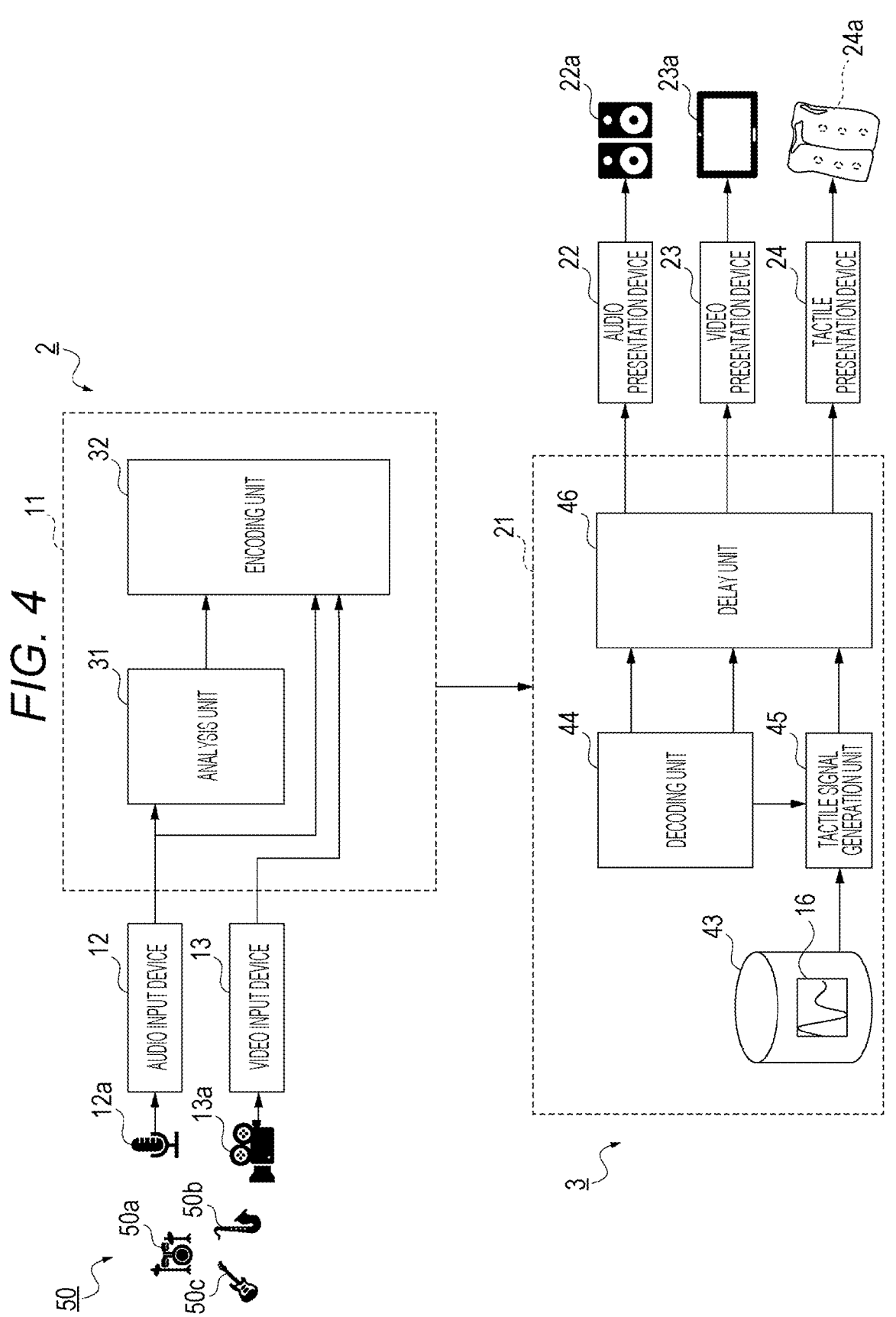
FIG. 4 is a diagram illustrating a first specific example of the transfer system.

FIG. 4 is a diagram for explaining a first specific example of the transfer system 1. FIG. 5 is a diagram for explaining analysis results and parameters. Note that only configurations necessary for the description will be illustrated below.

As illustrated in FIG. 4, in the first specific example, the audio emitted from various musical instruments 50 in live performance are collected by the microphone 12a and input to the audio input device 12 as audio signals. Here, it is assumed that the musical instrument 50 includes a drum 50a, a saxophone 50b, and a base 50c.

Furthermore, a live performance including the musical instrument 50 is imaged by the video camera 13*a* and is input to the video input device 13 as a video signal.

On the other hand, no tactile signal is input to the tactile input device 14. Instead, the storage unit 43 of the reception device 21 stores a template waveform 16 for generating a tactile signal. The reception device 21 generates a tactile signal by deforming the template waveform 16 on the basis of the parameter.

In the transmission device 11, the audio signal input to the audio input device 12 is input to the analysis unit 31 and the encoding unit 32 as needed. Furthermore, the video signal input to the video input device 13 is input to the encoding unit 32 as needed.

When an audio signal is input, the analysis unit 31 performs audio information analysis in real time. Then, as illustrated in FIG. 5, as an analysis result of the audio information analysis, for example, musical characteristics such as a section SE1 to which an audio signal AS1 is input is a Solo performance section of the base 50*c*, a section SE2 to which an audio signal AS2 is input is a section of a melodic tone of a calm atmosphere of the saxophone 50*b*, and a section SE3 to which an audio signal AS3 is input is a highlight in music and a section in which intense performance by all the musical instruments is performed is obtained.

The analysis unit 31 determines a parameter for generating a tactile signal in the reception device 21 on the basis of the analysis result of these musical characteristics. in the first specific example, three parameters of an amplitude, an attenuation rate, and an onset time of a template waveform are set as parameters. Note that the parameters of first specific example only need to include at least one of the amplitude, the attenuation rate, or the onset time of the template waveform, and it is desirable that all three parameters are included.

Then, for the section SE1, for example, the analysis unit 31 determines the amplitude to be 0.8 times, the attenuation rate to be large, and the onset time to be the sound production timing of the base 50*c* so that a powerful and sharp tactile stimulus can be obtained in conjunction with the sound of the base 50*c*.

Furthermore, for the section SE2, for example, the analysis unit 31 determines the amplitude to be 0.3 times, the attenuation rate to be small, and the onset time to be the sound production timing of a sound (for example, first and last) having an important meaning in terms of music among the sound production timings of the saxophone 50*b* so as to express the continuous sound of the wind instrument and obtain a tactile stimulus that is appropriately thinned out and is not too rhythmic.

Furthermore, for the section SE3, for example, the analysis unit 31 determines the amplitude to be 1.0 times, the attenuation rate to be medium, and the onset time to be the sound production timing of the kicking sound of the drum 50*a* so that powerful and rhythmic tactile stimulus continues.

Here, what kind of parameter the musical characteristics is converted into may be set according to the intention of an artist or a performer, or may be automatically set by a software developer by design or a technique such as machine learning.

The parameters obtained from the analysis unit 31 in this manner are encoded together with the audio signal and the video signal by the encoding unit 32, and transmitted to the reception device 21 as coded data. That is, the coded data includes the audio signal, the video signal, and the parameter, and does not include the template waveform 16.

When receiving the coded data, the reception device 21 decodes the coded data in the decoding unit 44 to acquire the audio signal, the video signal, and the parameter.

The tactile signal generation unit 45 reads the template waveform 16 from the storage unit 43 and deforms the template waveform 16 on the basis of the parameter to generate a tactile signal as illustrated in the lower part of FIG. 5.

In the section SE1, the tactile signal has a waveform pattern in which the amplitude of the template waveform 16 is multiplied by 0.8, the attenuation rate is set to be large, and the tactile stimulus is given at the sound production timing of the base 50*c*.

Furthermore, in the section SE2, the tactile signal has a waveform pattern in which the amplitude of the template waveform 16 is multiplied by 0.3, the attenuation rate is set to be small, and the tactile stimulus is given at the sound production timing of the sound having an important meaning in terms of music among the sound production timing of the saxophone 50*b*.

Furthermore, in the section SE3, the tactile signal has a waveform pattern in which the amplitude of the template waveform 16 is multiplied by 1.0 times, the attenuation rate is set to be medium, and a tactile stimulus is given in accordance with the kicking sound of the drum 50*a*.

Thereafter, the delay unit 46 performs delay processing of delaying the audio signal and the video signal and synchronizing them with the audio signal, the video signal, and the tactile signal.

Figure 6:
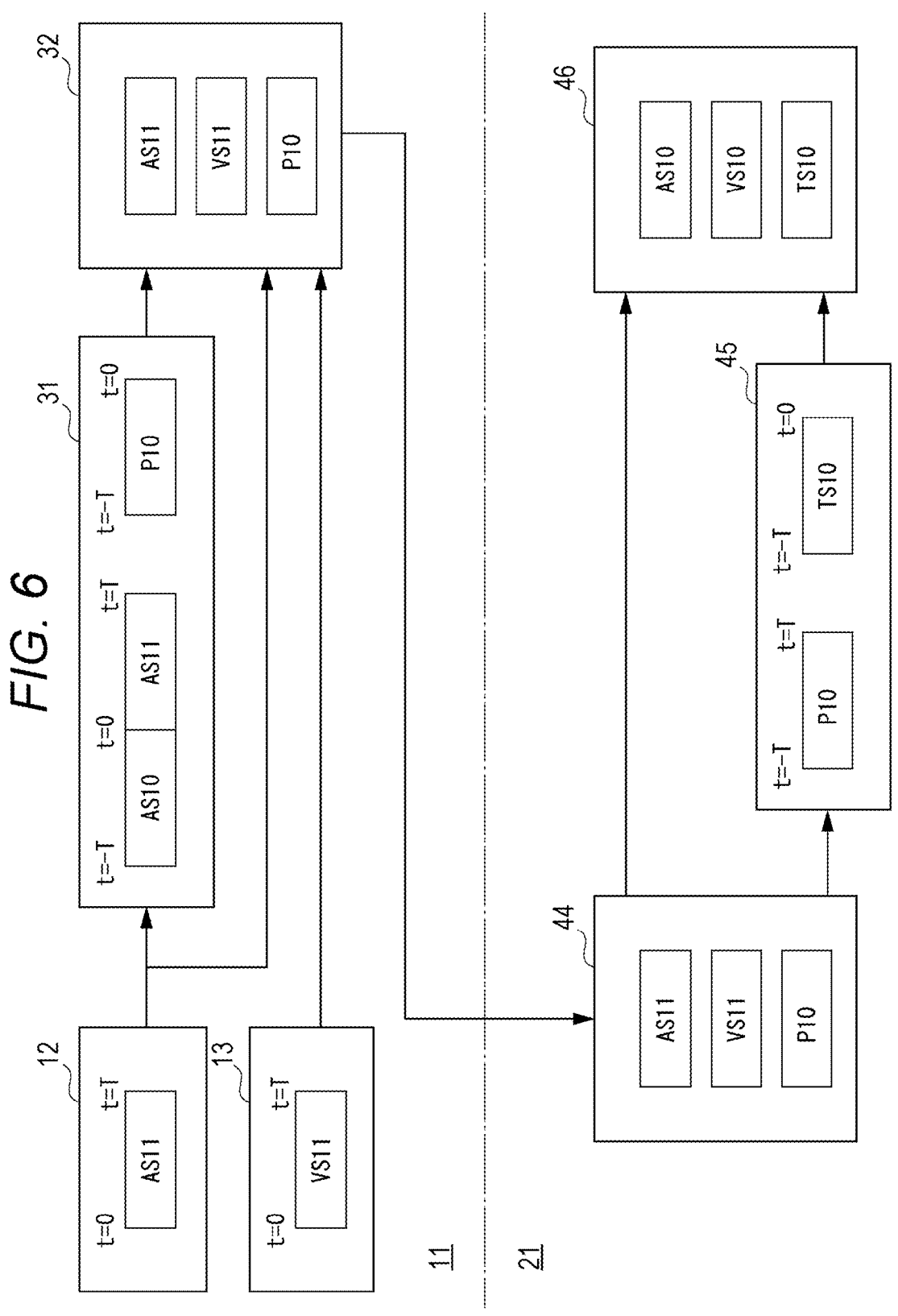
FIG. 6 is a diagram for explaining delay processing.

FIG. 6 is a diagram for explaining delay processing.

As described above, the analysis unit 31 performs audio information analysis on the audio signal input to the audio input device 12, and determines the parameter on the basis of the analysis result. However, in order to perform the audio information analysis, there may be a case where an audio signal of a time longer than the time of the unit of transmission of the coded data transmitted from the transmission device 11 is required.

For example, it is assumed that time T is used as a unit of transmission in the transmission device 11, but an audio signal at time 2T is required for audio information analysis by the analysis unit 31. At this time, as illustrated in FIG. 6, it is assumed that an audio signal AS11 and a video signal VS11 from time 0 to time T are acquired from the audio input device 12 and the video input device 13, respectively.

Then, the analysis unit 31 couples the audio signal AS10 from time −T to time 0 buffered inside and the acquired audio signal AS11, and performs audio information analysis by the audio signal for time 2T. Note that buffering may be performed in the storage unit 35.

As a result, the analysis unit 31 determines a parameter P10 for generating a tactile signal from time −T to time 0. Then, the encoding unit 32 encodes the audio signal AS11, the video signal VS11, and the parameter P10 to generate coded data, and transmits the coded data to the reception device 21.

In the reception device 21, the decoding unit 44 decodes the received coded data to obtain the audio signal AS11, the video signal VS11, and the parameter P10. Then, the tactile signal generation unit 45 generates a tactile signal TS10 from time −T to time 0 on the basis of the parameter P10.

Therefore, the reception device 21 obtains the audio signal AS11 and the video signal VS11 from time 0 to time T and the tactile signal TS10 from time −T to time 0 on the basis of the received coded data. That is, the audio signal AS11 and the video signal VS11 are asynchronous signals with the tactile signal TS10.

Therefore, the delay unit 46 buffers the audio signal and the video signal. Note that buffering may be performed in the storage unit 43.

Then, the delay unit 46 delays the audio signal and the video signal by time T, outputs the buffered audio signal AS10 and video signal VS10 from time −T to time 0 to the audio presentation device 22 and the video presentation device 23, and outputs the tactile signal TS10 from time −T to time 0 to the tactile presentation device 24.

Then, in the audio presentation device 22, audio based on the audio signal is output from the voice output unit 22a. Furthermore, in the video presentation device 23, video based on the video signal is displayed on the display unit 23a. Furthermore, in the tactile presentation device 24, vibration based on the tactile signal is output from the vibrator 24a.

Therefore, it is possible to provide the user with audio, video, and tactile stimulus in synchronization. Note that the delay amount of how much delay should be used for synchronization can be derived in principle if the operation of the analysis unit 31 is known as in the first specific example, and thus the value may be used. Furthermore, the delay amount may be determined with reference to a time stamp attached to each signal. If the time stamp is used, it is possible to compensate for and synchronize a delay generated from a source other than the length of the analysis section of the analysis unit 31.

On the other hand, it is also possible to design the analysis unit 31 so that the analysis unit 31 determines a parameter for generating a tactile signal from time 0 to time T by audio information analysis of an audio signal from time −T to time T. However, in this case, the transmission of the audio signal itself is delayed by time T for analysis. In a case where it is assumed that a communication band between the transmission device 11 and the reception device 21 fluctuates or a measure against a communication failure is taken, it is expected that delaying the transmission makes it difficult to cope with the fluctuation or the measure. Therefore, by performing transmission without delay at a point of time when a signal of a unit of transmission is obtained as in the first specific example, it is possible to reduce interruption of audio and video.

In this way, the user can experience the tactile stimulus reflecting the musical characteristics in synchronization with the audio and the video. Since the tactile stimulus changes depending on the mood of music, the performance part, and the development of music, the tactile stimulus is more synchronized with the music, and the user can obtain a higher realistic feeling in the remote live.

Furthermore, the synchronization by the delay unit 46 is realized only by the reception device 21 alone, and is not synchronized with the audio, the video, and the tactile stimulus felt by the user who actually views the live performance at the concert hall or another remote place. However, the amount of time difference generated between the user and the tactile stimulus felt by another user is such that the analysis delay of music is added to the delay amount of the existing communication scheme, and it is possible to maintain the real-time property to such an extent that it does not hinder the sharing of the impression between the users.

As described above, in the transfer system 1 of the first specific example, the user who views the live at the remote place can experience the high-quality tactile stimulus reflecting the musical intention, and it is possible to view the live performance from the remote place in real time and enhance the realistic feeling of the live viewing.

Figure 7:
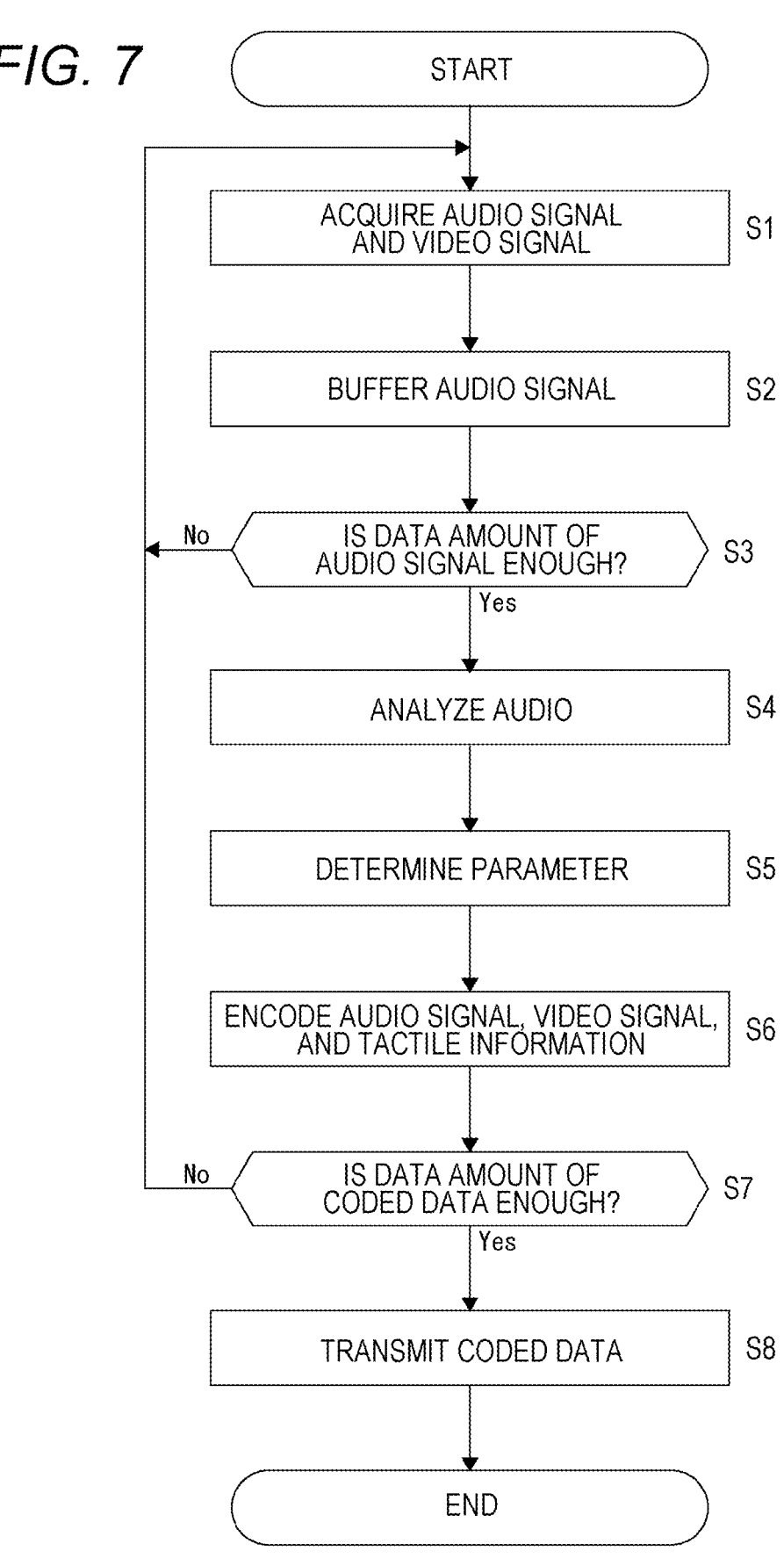
FIG. 7 is a flowchart illustrating a flow of transmission processing in the transmission device.

FIG. 7 is a flowchart illustrating a flow of transmission processing in the transmission device 11. As illustrated in FIG. 7, in step S1, the analysis unit 31 and the encoding unit 32 acquire the audio signal from the audio input device 12. Furthermore, the encoding unit 32 acquires a video signal from the video input device 13.

In step S2, the analysis unit 31 buffers the audio signal acquired in step S1. Then, in step S3, the analysis unit 31 determines whether the data amount of the audio signal buffered for performing the audio information analysis is sufficient. As a result, in a case where the data amount of the audio signal is not sufficient (No in step S3), the process returns to step S1.

On the other hand, in a case where the data amount of the audio signal is sufficient (Yes in step S3), the analysis unit 31 performs audio information analysis in step S4, and determines the parameter in step S5. Then, in step S6, the encoding unit 32 encodes the audio signal, the video signal, and the parameter with a time stamp. Thereafter, in step S7, the transmission unit 34 determines whether or not the amount of coded data is sufficient for transmission, and in a case where the amount of coded data is not sufficient for transmission (No in step S7), the process returns to step S1.

On the other hand, in a case where the amount of coded data is sufficient for transmission (Yes in step S7), the transmission unit 34 transmits the coded data to the reception device 21 in step S8.

Figure 8:
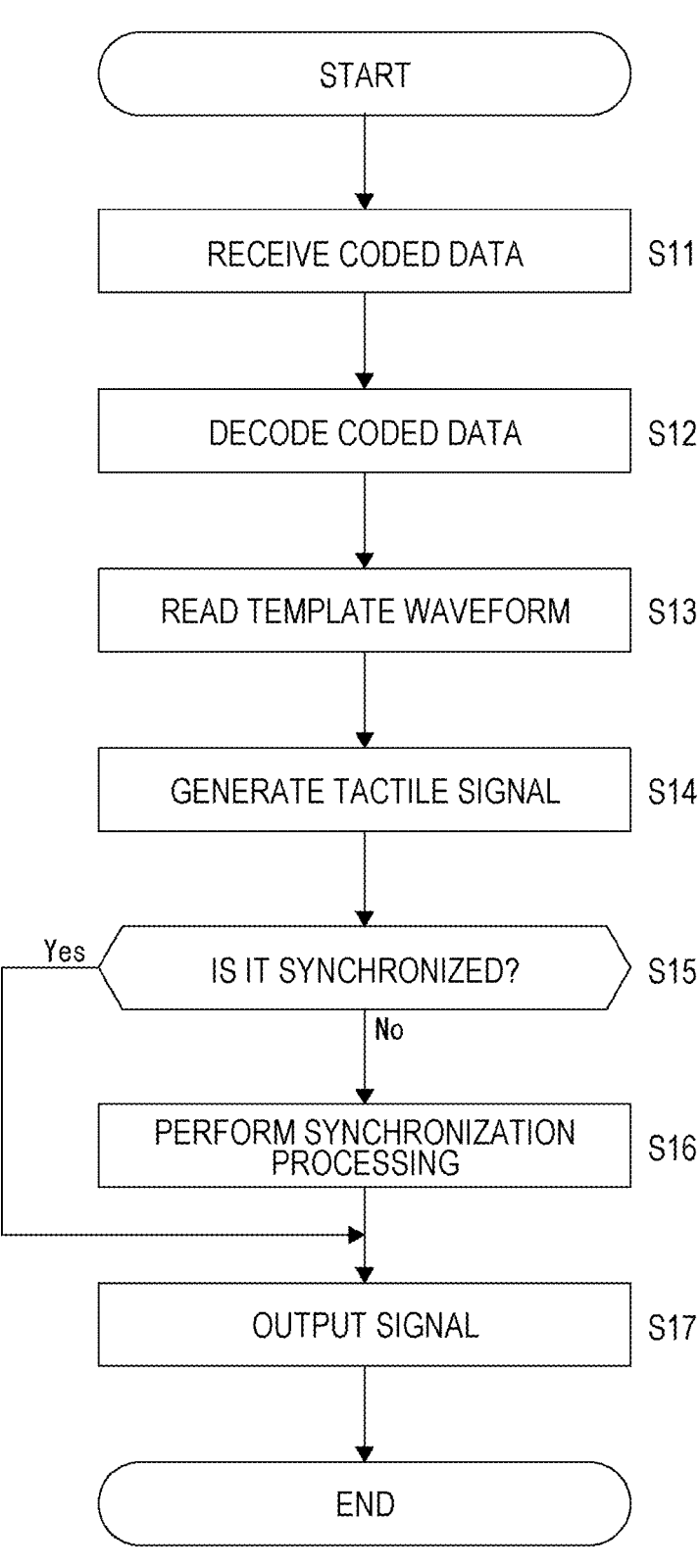
FIG. 8 is a flowchart illustrating a flow of reception processing in the reception device.

FIG. 8 is a flowchart illustrating a flow of reception processing in the reception device 21. As illustrated in FIG. 8, in step S11, the reception unit 42 receives the coded data transmitted from the transmission device 11. In step S12, the decoding unit 44 decodes the received coded data to obtain an audio signal, a video signal, and parameters. Then, in step S13, the tactile signal generation unit 45 reads the template waveform 16 stored in the storage unit 43.

In step S14, the tactile signal generation unit 45 generates a tactile signal by deforming the read template waveform 16 on the basis of the parameter. In subsequent step S15, the delay unit 46 determines whether the audio signal, the video signal, and the tactile signal are synchronized. As a result, in a case where the audio signal, the video signal, and the tactile signal are synchronized with each other (Yes in step S15), the process proceeds to step S17.

On the other hand, in a case where the audio signal, the video signal, and the tactile signal are not synchronized with each other (No in step S15), the delay unit 46 executes synchronization processing for synchronizing the audio signal, the video signal, and the tactile signal in step S16. Then, in step S17, the delay unit 46 outputs the audio signal to the audio presentation device 22, and causes the voice output unit 22a to output a voice based on the audio signal. Furthermore, the delay unit 46 outputs the video signal to the video presentation device 23, and causes the display unit 23a to display the video based on the video signal. Furthermore, the delay unit 46 outputs the tactile signal to the tactile presentation device 24, and causes the vibrator 24a to output vibration based on the tactile signal.

Further, in the first specific example, one template waveform 16 is stored in the storage unit 43, but a plurality of template waveforms may be stored in the storage unit 43 so as to be identifiable by an ID. In this case, when determining the parameter on the basis of the analysis result, the analysis unit 31 also determines the ID of the template waveform to be used, and sends the ID to the encoding unit 32. Then, the encoding unit 32 includes the ID of the template waveform in the coded data together with the parameter. Furthermore, when generating the tactile signal, the tactile signal generation unit 45 reads the template waveform corresponding to the ID included in the coded data from the storage unit 43 and deforms the template waveform on the basis of the parameter, thereby generating the tactile signal.

In this way, it is possible to give a tactile stimulus based on a plurality of template waveforms to the user, and it is possible to further enhance the realistic feeling of live viewing.

4.2 Second Specific Example

Figure 9:
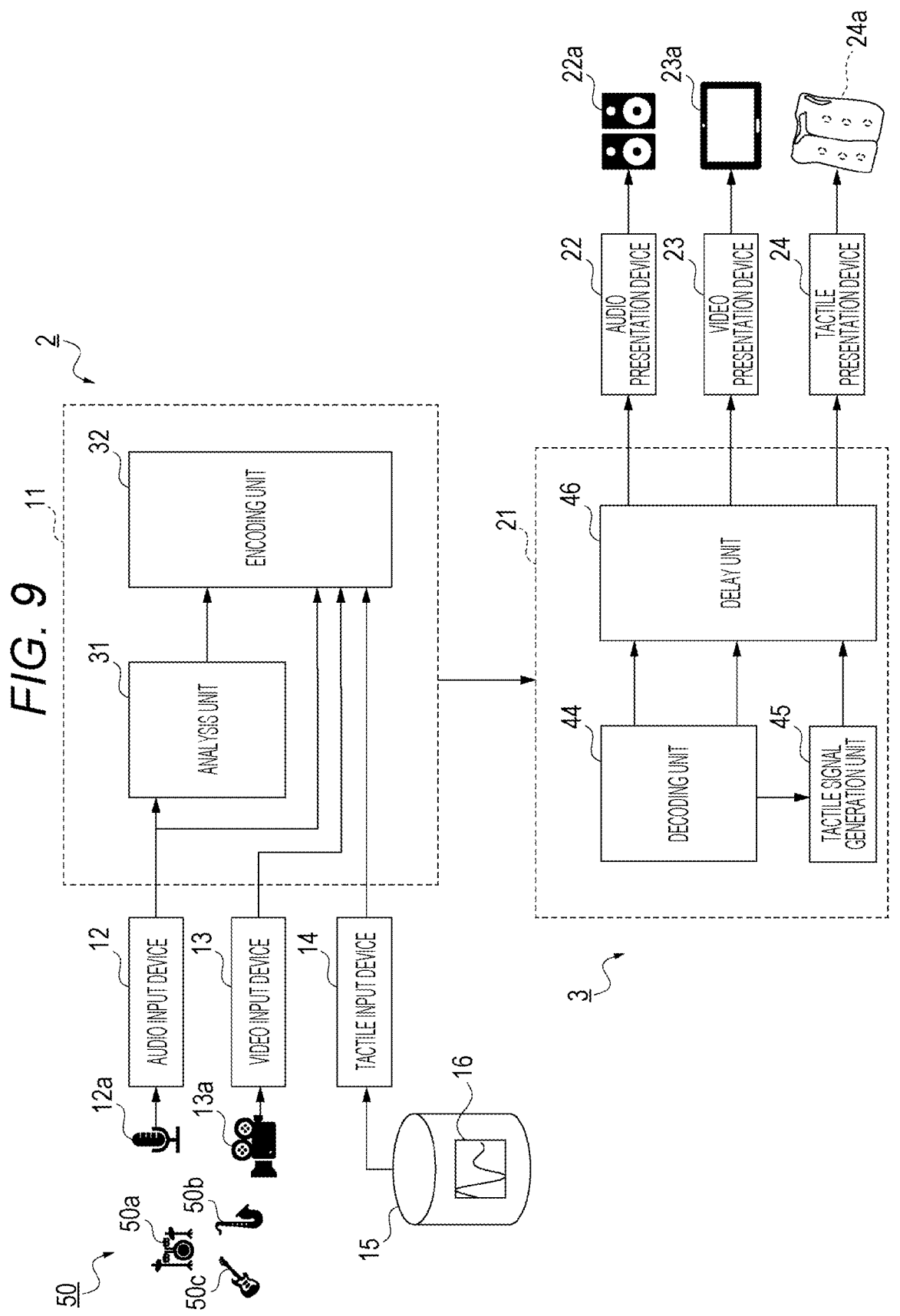
FIG. 9 is a diagram for explaining a second specific example of the transfer system.

FIG. 9 is a diagram illustrating a second specific example of the transfer system 1. Note that, in the second specific example, processing different from that in the first specific example will be described, and description of processing similar to that in the first specific example will be omitted.

As illustrated in FIG. 9, in the transmission device 11 of the second specific example, the template waveform 16 is stored in advance in the predetermined storage device 15. On the other hand, the storage unit 43 of the reception device 21 does not store the template waveform 16 in advance.

Here, the storage device 15 is, for example, a storage device such as an HDD or an SSD, and may be provided in the transmission device 11 (or the storage unit 35), or may be connected via a network.

In the second specific example, the tactile input device 14 reads the template waveform 16 from the storage device 15 and inputs the template waveform to the encoding unit 32. Then, the encoding unit 32 encodes the template waveform 16 input from the tactile input device 14 to generate coded data, in addition to the audio signal input from the audio input device 12, the video signal input from the video input device 13, and the parameters determined by the analysis unit 31. Note that the coded data may include the template waveform every time, may include the template waveform only once at the beginning, or may include the template waveform every predetermined number of times.

Then, in the reception device 21, the decoding unit 44 decodes the coded data to obtain the audio signal, the video signal, the parameter, and template waveform 16. The tactile signal generation unit 45 generates a tactile signal by deforming the template waveform 16 obtained by decoding on the basis of the parameter.

As described above, in the second specific example, the storage capacity for storing the template waveform 16 in the reception device 21 can be saved. On the other hand, in the first specific example, the amount of communication between transmission and reception can be saved as much as it is not necessary to transmit the template waveform 16.

Note that, in the second specific example, a vibration waveform emitted from the musical instrument 50 may be acquired by an acceleration sensor or the like of the tactile input device 14, and the signal waveform may be stored in the storage device 15 as the template waveform 16.

Furthermore, in the second specific example, one template waveform 16 is stored in the storage device 15, but a plurality of template waveforms may be stored in the storage device 15 so as to be identifiable by an ID. In this case, when determining the parameter on the basis of the analysis result, the analysis unit 31 also determines the ID of the template waveform to be used. Then, the encoding unit 32 reads the template waveform indicated by the ID determined by the analysis unit 31 from the storage device 15 and causes the template waveform to be included in the coded data together with the parameter. Furthermore, when generating the tactile signal, the tactile signal generation unit 45 generates the tactile signal by deforming the template waveform included in the coded data on the basis of the parameter.

In this way, it is possible to give a tactile stimulus based on a plurality of template waveforms to the user, and it is possible to further enhance the realistic feeling of live viewing.

4.3 Third Specific Example

Figure 10:
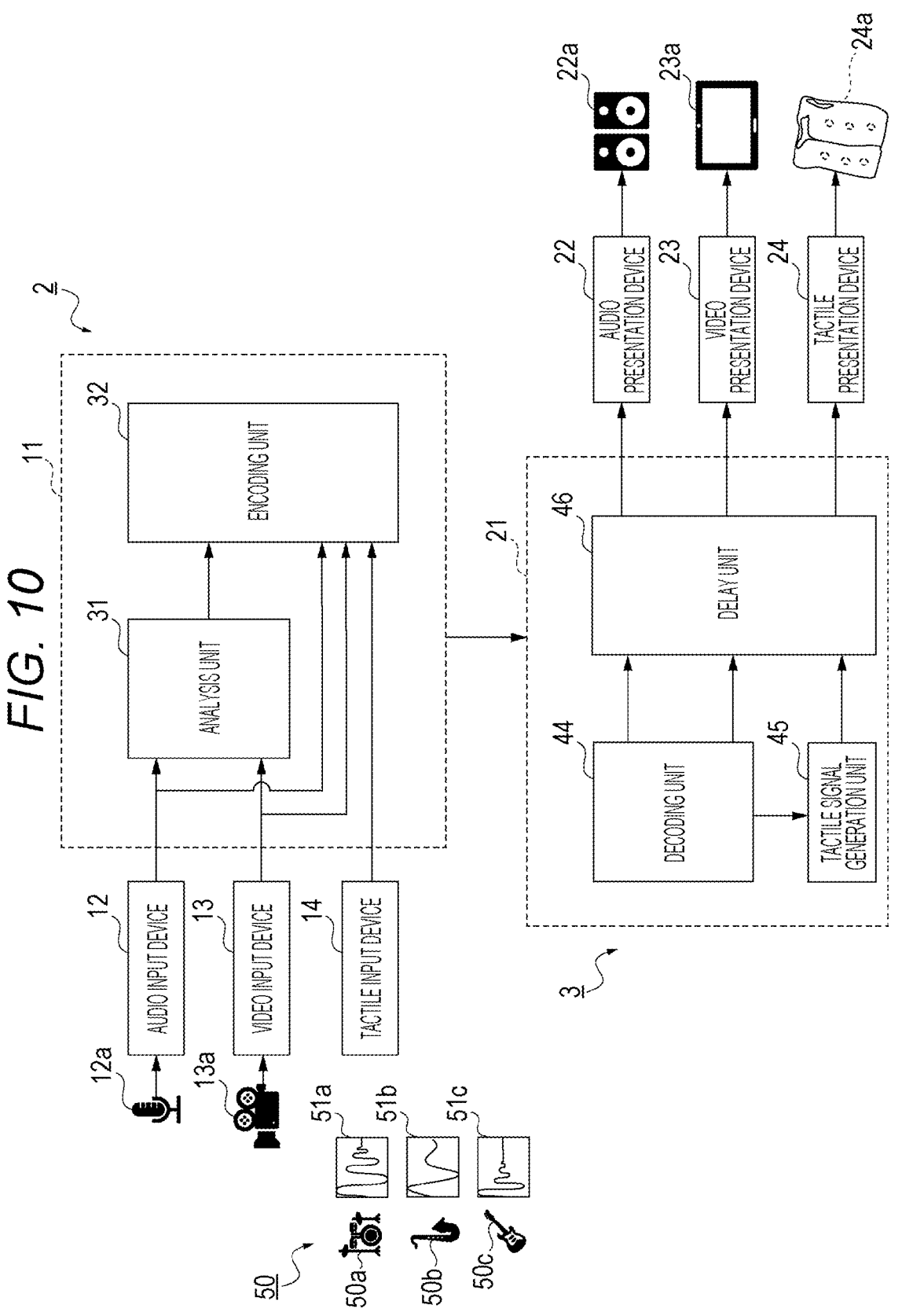
FIG. 10 is a diagram for explaining a third specific example of the transfer system.
Figure 11:
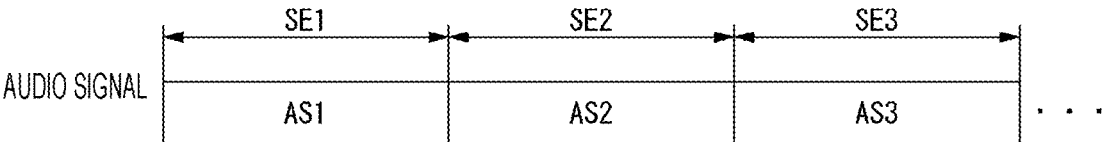
FIG. 11 is a diagram for explaining an analysis result and a mixing coefficient.

FIG. 10 is a diagram for explaining a third specific example of the transfer system 1. FIG. 11 is a diagram for explaining an analysis result and a mixing coefficient (parameter). Note that, in the third specific example, processing different from those in the first and second specific examples will be described, and description of processing similar to those in the first and second specific examples will be omitted.

As illustrated in FIG. 10, in the transmission device 11 of the third specific example, instead of the template waveform 16 stored in the storage device 15 in the second specific example, vibration waveforms emitted from different musical instruments 50 (generation sources of audio signals) are acquired as needed by an acceleration sensor or the like of the tactile input device 14. For example, the vibration waveform emitted from the drum 50*a* is acquired as a drum waveform 51*a*, the vibration waveform emitted from the saxophone 50*b* is acquired as a saxophone waveform 51*b*, and the vibration waveform emitted from the base 50*c* is acquired as a base waveform 51*c*.

When an audio signal is input, the analysis unit 31 performs audio information analysis in real time similarly to the first specific example.

As illustrated in FIG. 11, as an analysis result of the audio information analysis, musical characteristics such as a section SE1 to which an audio signal AS1 is input is a Solo performance section of the base 50*c*, a section SE2 to which an audio signal AS2 is input is a section of a melodic tone of a calm atmosphere of the saxophone 50*b*, and a section SE3 to which an audio signal AS3 is input is a highlight in music and a section in which intense performance by all the musical instruments is performed is obtained.

The analysis unit 31 determines a parameter for generating a tactile signal in the reception device 21 on the basis of the analysis result of these musical characteristics. In the third specific example, a mixing coefficient for mixing the three waveforms is set as a parameter. The mixing coefficient corresponds to a1, a2, and a3 when the tactile signal g (n) is expressed by Expression (1).

$$g(n) = a1 \times f1(n) + a2 \times f2(n) + a3 \times f3(n) \qquad (1)$$

Note that f1 (n), f2 (n), and f3 (n) represent the drum waveform 51*a*, the saxophone waveform 51*b*, and the base waveform 51*c*, respectively.

Then, the analysis unit 31 determines the section SE1 as, for example, a1=0.1, a2=0.0, and a3=1.0 so as to emphasize the vibration of the base 50*c*.

Furthermore, for the section SE2, for example, the analysis unit 31 determines a1=0.1, a2=1.0, and a3=0.1 so as to emphasize the vibration of the saxophone 50*b* and remove the rhythmical or excessively powerful sense.

Furthermore, the analysis unit 31 determines the section SE3 as, for example, a1=1.0, a2=1.0, and a3=1.0 so as to mix all the vibrations and make powerful.

The encoding unit 32 encodes an audio signal, a video signal, and tactile information (three vibration waveforms and parameters) to generate coded data. Then, the transmission unit 34 transmits the coded data to the reception device 21.

In the reception device 21, the decoding unit 44 decodes the coded data to obtain an audio signal, a video signal, and three vibration waveforms and parameters. Then, the tactile signal generation unit 45 generates a tactile signal by mixing (synthesizing) the three vibration waveforms on the basis of a mixing coefficient that is a parameter.

The delay unit 46 performs synchronization processing on the audio signal, the video signal, and the tactile signal, causes the audio presentation device 22 to output audio based on the audio signal, causes the video presentation device 23 to display video based on the video signal, and causes the tactile presentation device 24 to output vibration based on the tactile signal.

Note that, although the three vibration waveforms are input to the tactile input device 14, the three vibration waveforms may be recorded in advance and stored in the storage device 15 of the transmission device 11. Furthermore, three vibration waveforms may be stored in the storage unit 43 of the reception device 21. In this case, in the transmission device 11, the three vibration waveforms may be read from the storage unit 43 in the reception device 21 without encoding the vibration waveforms in the encoding unit 32, and the tactile signal may be generated on the basis of the mixing coefficient.

Furthermore, in the third specific example, three vibration waveforms are provided, but the number of vibration waveforms may be any number.

4.4 Fourth Specific Example

In the third specific example, the vibration waveform emitted from the musical instrument 50 is input to the tactile input device 14, but in the fourth specific example, a simulated vibration waveform may be generated by signal processing on an audio signal. For example, it is conceivable to generate and use a simulated vibration waveform that emphasizes a powerful low-frequency sound by applying a low-pass filter that extracts a low-frequency band to an audio signal. Even in a case where such a simulated vibration waveform is input to the tactile input device 14, it is possible to generate tactile signal reflecting musical characteristics similarly to the third specific example, and it is possible to enhance the realistic feeling felt by the user.

4.5 Fifth Specific Example

Figure 12:
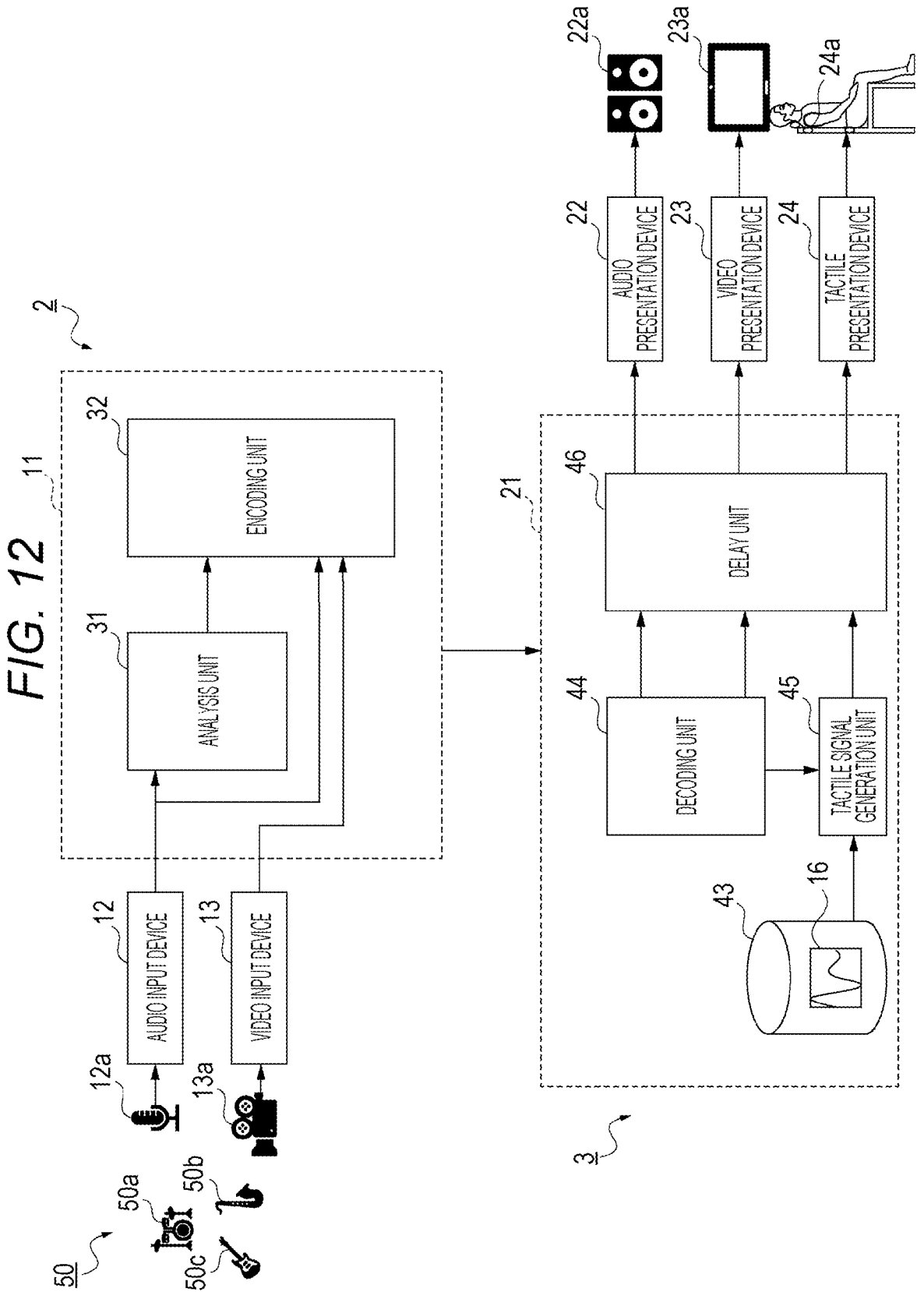
FIG. 12 is a diagram for explaining a fifth specific example of the transfer system.

FIG. 12 is a diagram illustrating a fifth specific example of the transfer system 1. FIG. 13 is a diagram for explaining analysis results and parameters. Note that, in the fifth specific example, processing different from that of the first to fourth specific examples will be described, and description of processing similar to that of the first to fourth specific examples will be omitted.

In the fifth specific example, as illustrated in FIG. 12, a plurality of vibrators 24a is provided in a chair-type tactile presentation device 24. The plurality of vibrators 24a is provided, for example, at positions corresponding to different parts (neck, back, and waist) of the user.

As illustrated in FIG. 13, the analysis unit 31 obtains, as an analysis result of audio information analysis, for example, musical characteristics in which a section SE11 to example, musical characteristics in which a section SE11 to which an audio signal AS21 is input is a section with a tense feeling, and a section SE12 to which an audio signal AS22 is input is a calm section.

The analysis unit 31 determines a parameter for generating a tactile signal in the reception device 21 on the basis of the analysis result of these musical characteristics. In the fifth specific example, which vibrator 24a is vibrated is set as a parameter.

Then, the analysis unit 31 determines to vibrate the vibrator 24a corresponding to the neck and the back, for example, for the section SE11 with a tense feeling.

Furthermore, the analysis unit 31 determines to vibrate the vibrator 24a corresponding to the waist for the section SE12 of calm music. Note that the vibration waveform is only required to be determined as in the first and second specific examples.

Then, the encoding unit 32 generates coded data by encoding parameters (information indicating which vibrator 24a is to be vibrated) in addition to the audio signal and the video signal. Then, the transmission unit 34 transmits the coded data to the reception device 21.

In the reception device 21, the decoding unit 44 decodes the coded data to obtain an audio signal, a video signal, and parameters. Then, the tactile signal generation unit 45 generates a tactile signal corresponding to each vibrator 24a on the basis of the parameter. That is, the tactile signal generation unit 45 generates a plurality of tactile signals for respective different parts of the user.

The delay unit 46 performs synchronization processing on the audio signal, the video signal, and the tactile signal, causes the audio presentation device 22 to output audio based on the audio signal, causes the video presentation device 23 to display video based on the video signal, and causes each vibrator 24a of the tactile presentation device 24 to present a tactile stimulus based on the tactile signal.

Therefore, in the section SE11, it is possible to give the user a tense feeling of being stimulated around the neck, and in the section SE12, it is possible to give the user a calm stimulation to the waist.

Note that the tactile presentation device 24 can be similarly realized in various devices capable of performing multipoint tactile stimulus, such as a wearable vibrator of a neck hanging type and a jacket with a built-in vibrator.

4.6 Sixth Specific Example

In a sixth specific example, the parameter is determined on the basis of the video signal. Note that, in the sixth specific example, processing different from that in the third specific example will be described, and description of processing similar to that in the third specific example will be omitted.

Figure 14:
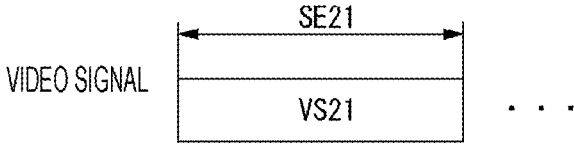
FIG. 14 is a diagram for explaining analysis results and parameters.

FIG. 14 is a diagram for explaining an analysis result and a mixing coefficient. The analysis unit 31 performs video information analysis on the video signal input to the video input device 13. The video includes staging information such as a specific performer being turned up in camerawork or a lighting blinking intensely. Therefore, in the video information analysis, the music information and the comprehensive staging characteristics of the live performance are acquired from the video signal.

Then, the analysis unit 31 extracts information of the camerawork and the illumination included in the video signal by the video information analysis and determines the parameter. Here, as in the third specific example, conversion into a mixing coefficient is performed as a parameter. For example, as illustrated in FIG. 14, the analysis unit 31 determines the coefficients a1=0.5, a2=0.0, and a3=0.5 such that the amplitude is slightly moderated and the vibration of the base 50c is emphasized in the section SE21 to which the video signal VS21 in which the base 50c is turned up in the blue illumination is input.

The encoding unit 32 encodes an audio signal, a video signal, and tactile information (three vibration waveforms and parameters) to generate coded data. Then, the transmission unit 34 transmits the coded data to the reception device 21.

In the reception device 21, the decoding unit 44 decodes the coded data to obtain an audio signal, a video signal, and three vibration waveforms and parameters. Then, the tactile signal generation unit 45 generates a tactile signal by mixing (synthesizing) the three vibration waveforms on the basis of a mixing coefficient that is a parameter.

The delay unit 46 performs synchronization processing on the audio signal, the video signal, and the tactile signal, causes the audio presentation device 22 to output audio based on the audio signal, causes the video presentation device 23 to display video based on the video signal, and causes the tactile presentation device 24 to output vibration based on the tactile signal.

Note that the analysis unit 31 may determine a parameter by combining both the video information analysis and the audio information analysis, and in that case, it is only required to determine one parameter by comparing and integrating the results of both.

As a result, musical and staging intentions can be reflected in the tactile signal, and the realistic feeling of the user can be improved while real-time properties are maintained.

4.7 Seventh Specific Example

In a seventh specific example, audio information analysis of an audio signal and performance information analysis of a video signal by the analysis unit 31 may be performed by machine learning using a deep neural network. In this case, an estimation model obtained by preparing a set of existing audio signals and video signals and tactile signals to be given thereto and performing learning may be incorporated into the analysis unit 31.

4.8 Eighth Specific Example

In the first to seventh specific examples, the parameter is set using the music information and the performance information in units of sounds and phrases in music, but the parameter for generating the tactile signal may be set in units of larger time. For example, a parameter may be set to generate a tactile signal so that the first song, the excitement of an encore, and a slightly calm atmosphere in the middle of one live stage can be reflected.

For this purpose, information of a tone by music analysis and a state of lighting of a stage by video analysis can be used as a clue in the case of using an analysis technique.

5. Structure of Coded Data

Figure 15:
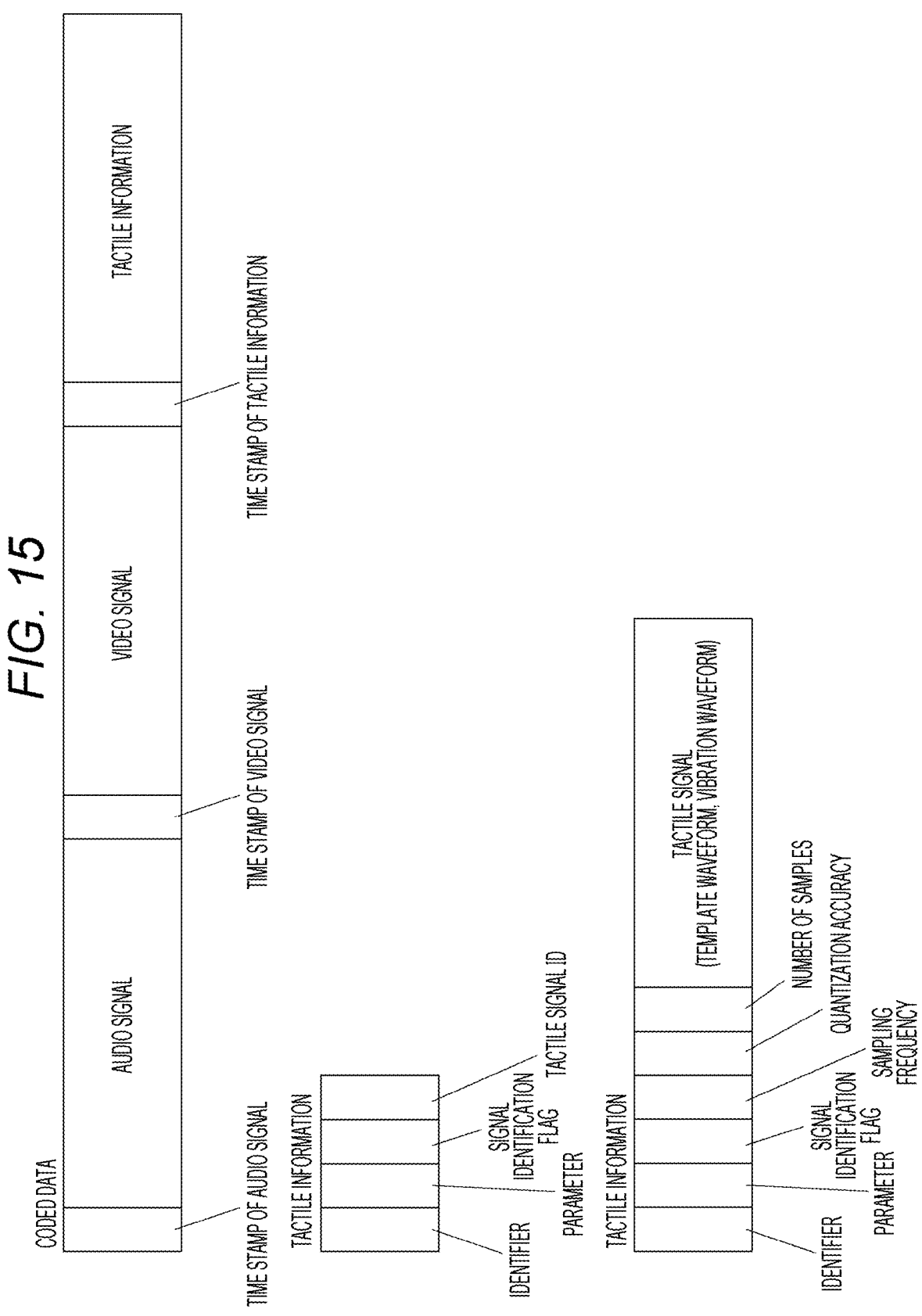
FIG. 15 is a diagram for explaining a structure of coded data.

FIG. 15 is a diagram illustrating a structure of coded data. As illustrated in the upper part of FIG. 15, the coded data includes an audio signal and a time stamp thereof, a video signal and a time stamp thereof, and vibration information and a time stamp thereof.

This time stamp is used for compensation in synchronization processing by the delay unit 46. Furthermore, the audio signal and the video signal are encoded on the basis of a known audio video transmission/reception data format.

As illustrated in the middle part and the lower part of FIG. 15, the identifier is stored at the head of the tactile information. Furthermore, in the tactile information, the parameters set in the first to eighth specific examples described above are stored following the identifier. For example, the amplitude, the attenuation rate, and the onset time are used in the first specific example, and the mixing coefficient is used in the third specific example.

Furthermore, in the tactile information, a signal identification flag is stored following the parameter. The signal identification flag is a 1-bit flag for identifying whether the following data is an ID for reading a vibration waveform from the storage unit 43 of the reception device 21 or a tactile signal transmitted from the transmission device 11. For example, in a case where the signal identification flag is 0, the following data is the ID, and in a case where the signal identification flag is 1, the following data is the vibration signal transmitted from the transmission device 11.

Then, as illustrated in the middle part of FIG. 15, in a case where the signal identification flag is 0, the tactile information stores the tactile signal ID subsequent to the signal identification flag.

On the other hand, as illustrated in the lower part of FIG. 15, in a case where the signal identification flag is 1, the tactile information sequentially stores the sampling frequency, the quantization accuracy, the number of samples, and the vibration signal body of the vibration signal following the signal identification flag.

The encoding unit 32 generates coded data having such a data structure.

6. Modification

Note that the embodiments are not limited to the specific examples described above and may be configured as various modification examples.

For example, a case where each configuration of the transmission device 11 and the audio input device 12 is a hardware configuration has been described as an example. However, each configuration of the transmission device 11 and the audio input device 12 may be a software configuration, or may be a combination of a hardware configuration and a software configuration. In the case of the software configuration, the configuration is implemented by a program loaded from a recording medium into a memory by a CPU or a DSP.

Furthermore, the analysis unit 31 and the encoding unit 32 are provided in the transmission device 11. However, one or both of the analysis unit 31 and the encoding unit 32 may be provided in a device via a network. That is, the determination of the parameter and the generation of the coded data may be performed on the cloud.

7. SUMMARY

As described above, the tactile signal generation device (reception device 21) according to the present technology includes the tactile signal generation unit 45 that generates a tactile signal for providing a tactile stimulus to the user, on the basis of musical characteristics of an audio signal or staging characteristics of a video signal.

Therefore, the tactile signal generation device can generate the tactile signal reflecting the musical characteristics of the audio signal or the staging characteristics of the video signal.

Therefore, the tactile signal generation device can perform tactile presentation reflecting a musical or staging intention, and can improve the realistic feeling given to the user.

Furthermore, in the tactile signal generation device, it is conceivable that the tactile signal generation unit 45 generates a tactile signal by deforming a predetermined waveform (template waveform, drum waveform 51*a*, saxophone waveform 51*b*, base waveform 51*c*) on the basis of a parameter determined by musical characteristics or staging characteristics.

Therefore, in a case where the template waveform is stored in the tactile signal generation device, the communication amount can be reduced by the amount that the template waveform is not transmitted and received. Furthermore, in a case where the template waveform is not stored in the tactile signal generation device, the storage capacity can be saved.

Furthermore, the tactile signal generation device includes a reception unit that receives data (coded data) including an audio signal, a video signal, and a parameter.

Therefore, it is possible to perform tactile presentation to the user in the tactile signal generation device provided at a remote place from the device (transmission device 11) to which the audio signal and the video signal are input.

Furthermore, in the tactile signal generation device, it is conceivable that the parameter includes at least one of an amplitude, an attenuation rate, or an onset time of a predetermined waveform (template waveform).

Therefore, the predetermined waveform can be easily deformed by reflecting the musical characteristics of the audio signal or the staging characteristics of the video signal.

Furthermore, in the tactile signal generation device, the parameter may be a mixing coefficient for mixing a plurality of waveforms (vibration waveforms).

Therefore, by mixing the plurality of waveforms, tactile presentation reflecting more musical or staging intention can be performed.

Furthermore, in the tactile signal generation device, it is conceivable that the tactile signal generation unit generates a tactile signal by mixing waveforms of respective generation sources of audio signals on the basis of a mixing coefficient.

Therefore, for example, tactile presentation that reproduces vibrations emitted from different musical instruments can be performed.

Furthermore, in the tactile signal generation device, it is conceivable that the tactile signal generation unit generates a plurality of tactile signals for respective different parts of the user.

Therefore, this makes it possible to perform tactile presentation to different parts of the user according to a musical or staging intention.

Furthermore, it is conceivable that the staging characteristics of the tactile signal generation device is based on camerawork of a video camera that captures a video signal.

Therefore, it is possible to perform tactile presentation corresponding to a video images according to the camerawork.

Furthermore, in the tactile signal generation device, it is conceivable that a predetermined waveform (template waveform, drum waveform 51*a*, saxophone waveform 51*b*, base waveform 51*c*) is included in data (coded data).

Therefore, it is not necessary to store the template waveform in the tactile signal generation device, and the storage capacity can be saved.

Furthermore, it is conceivable that the tactile signal generation device includes the storage unit 43 that stores a predetermined waveform (template waveform, drum waveform 51*a*, saxophone waveform 51*b*, base waveform 51*c*), and the predetermined waveform is not included in the data (coded data).

Therefore, the communication amount can be reduced by the amount of not transmitting and receiving the predetermined waveform.

Furthermore, the tactile signal generation device includes a delay unit that synchronizes outputs of the audio signal, the video signal, and the tactile signal.

Therefore, audio, video, and tactile stimulus can be presented to the user in synchronization.

Furthermore, a tactile signal generation method of the present technology generates a tactile signal for providing a tactile stimulus to a user on the basis of musical characteristics of an audio signal or staging characteristics of a video signal.

Furthermore, a program of the present technology causes a computer to execute processing of generating a tactile signal for providing a tactile stimulus to a user on the basis of musical characteristics of an audio signal or staging characteristics of a video signal.

Such a program can be recorded in advance in an HDD as a storage medium built in a device such as a computer device, a ROM in a microcomputer having a CPU, or the like.

Alternatively, the program can be temporarily or permanently housed (recorded) in a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, a memory card, or the like. Such a removable recording medium can be provided as what is called package software.

Furthermore, such a program can be installed from the removable recording medium into a personal computer or the like, or can be downloaded from a download site via a network such as a local area network (LAN) or the Internet.

Furthermore, such a program is suitable for providing the tactile signal generation device of the embodiment in a wide range. For example, by downloading the program to a mobile terminal device such as a smartphone, a tablet, or the like, a mobile phone, a personal computer, game equipment, video equipment, a personal digital assistant (PDA), or the like, such equipment can be caused to function as the tactile signal generation device of the present disclosure.

Note that the effects described in this specification are merely examples and are not limited, and additional effects may be present.

8. Present Technology

Note that the present technology can also have the following configurations.

(1)

A tactile signal generation device including:

a tactile signal generation unit that generates a tactile signal for providing a tactile stimulus to a user on the basis of musical characteristics of an audio signal or staging characteristics of a video signal.

(2)

The tactile signal generation device according to (1), in which the tactile signal generation unit is configured to:

generate the tactile signal by deforming a predetermined waveform on the basis of a parameter determined by the musical characteristics or the staging characteristics.

(3)

The tactile signal generation device according to (2), further including:

a reception unit configured to receive data including the audio signal, the video signal, and the parameter.

(4)

The tactile signal generation device according to (2) or (3), in which the parameter includes:

at least one of an amplitude, an attenuation rate, or an onset time of the predetermined waveform.

(5)

The tactile signal generation device according to any one of (2) to (4), in which the parameter is a mixing coefficient for mixing a plurality of waveforms.

(6)

The tactile signal generation device according to (5), in which the tactile signal generation unit is configured to:

generate the tactile signal by mixing waveforms of the respective generation sources of the audio signal on the basis of the mixing coefficient.

(7)

The tactile signal generation device according to any one of (1) to (6), in which the tactile signal generation unit is configured to:

generate a plurality of the tactile signals for respective different parts of a user.

(8)

The tactile signal generation device according to any one of (1) to (7), in which the staging characteristics are based on camerawork of a video camera that captures the video signal.

(9)

The tactile signal generation device according to (3), in which the predetermined waveform is included in the data.

(10)

The tactile signal generation device according to (3), further including:

a storage unit that stores the predetermined waveform, in which the predetermined waveform is not included in the data.

(11)

The tactile signal generation device according to any one of (1) to (1), including:

a delay unit that synchronizes outputs of the audio signal, the video signal, and the tactile signal.

(12)

A tactile signal generation method including:

generating a tactile signal for providing a tactile stimulus to a user on the basis of musical characteristics of an audio signal or staging characteristics of a video signal.

(13)

A program causing a computer to execute:

generating a tactile signal for providing a tactile stimulus to a user on the basis of musical characteristics of an audio signal or staging characteristics of a video signal.

REFERENCE SIGNS LIST

1 Transfer system
2 Transmission system
3 Reception system
11 Transmission device
21 Reception device
31 Analysis unit
32 Encoding unit
44 Decoding unit
45 Tactile signal generation unit
46 Delay unit

The invention claimed is:

1. A tactile signal generation device, comprising:

a central processing unit (CPU) configured to:

acquire an audio signal and a video signal;

determine a plurality of musical characteristics based on the audio signal;

determine a plurality of staging characteristics based on the video signal;

determine a specific parameter based on at least one of the plurality of musical characteristics, or the plurality of staging characteristics;

deform a specific waveform based on the specific parameter;

generate a tactile signal based on the deformed specific waveform; and output a tactile stimulus to a user based on the generated tactile signal.

2. The tactile signal generation device according to claim 1, wherein the CPU is further configured to receive specific data that includes the audio signal, the video signal, and the specific parameter.

3. The tactile signal generation device according to claim 2, wherein the specific data further includes the specific waveform.

4. The tactile signal generation device according to claim 2, further comprising a memory configured to store the specific waveform, wherein the specific waveform is different from the specific data.

5. The tactile signal generation device according to claim 1, wherein the specific parameter includes at least one of an amplitude of the specific waveform, an attenuation rate of the specific waveform, or an onset time of the specific waveform.

6. The tactile signal generation device according to claim 1, wherein the specific parameter is a mixing coefficient to mix a plurality of waveforms.

7. The tactile signal generation device according to claim 6, wherein the CPU is further configured to:

acquire the audio signal from a plurality of generation sources; and generate the tactile signal based on the mixed plurality of waveforms, wherein each of the plurality of waveforms is associated with a respective generation source of the plurality of generation sources.

8. The tactile signal generation device according to claim 1, wherein the CPU is further configured to generate a plurality of tactile signals that includes the tactile signal, and each of the plurality of tactile signals is associated with a respective body part of a plurality of body parts of the user.

9. The tactile signal generation device according to claim 1, wherein the plurality of staging characteristics is based on camerawork of a video camera that captures the video signal.

10. The tactile signal generation device according to claim 1, wherein the CPU is further configured to synchronize an output of the audio signal, an output of the video signal, and the outputted tactile stimulus.

11. A tactile signal generation method, comprising:

in a tactile signal generation device:

acquiring an audio signal and a video signal;

determining a plurality of musical characteristics based on the audio signal;

determining a plurality of staging characteristics based on the video signal;

determining a specific parameter based on at least one of the plurality of musical characteristics, or the plurality of staging characteristics;

deforming a specific waveform based on the specific parameter;

generating a tactile signal based on the deformed specific waveform; and outputting a tactile stimulus to a user based on the generated tactile signal.

12. A non-transitory computer-readable medium having stored thereon, computer-executable instructions which, when executed by a computer, causes the computer to execute operations, the operations comprising:

acquiring an audio signal and a video signal;

determining a plurality of musical characteristics based on the audio signal;

determining a plurality of staging characteristics based on the video signal;

determining a specific parameter based on at least one of the plurality of musical characteristics, or the plurality of staging characteristics;

deforming a specific waveform based on the specific parameter;

generating a tactile signal based on the deformed specific waveform; and outputting a tactile stimulus to a user based on the generated tactile signal.

\* \* \* \* \*